United States Patent [19]

Kiesewetter et al.

[11] Patent Number: 5,177,199

[45] Date of Patent: Jan. 5, 1993

[54] WATER-SOLUBLE HYDROXYPROPYL SULFOETHYL CELLULOSE DERIVATIVES (HPSEC) HAVING A LOW DEGREE OF SUBSTITUTION AND A PROCESS FOR THEIR PRODUCTION

[75] Inventors: René Kiesewetter, Soltau-Ahlften; Klaus Szablikowski, Walsrode, both of Fed. Rep. of Germany

[73] Assignee: Wolff Walsrode Aktiengesellschaft, Walsrode, Fed. Rep. of Germany

[21] Appl. No.: 793,048

[22] Filed: Nov. 15, 1991

[30] Foreign Application Priority Data

Nov. 27, 1990 [DE] Fed. Rep. of Germany ....... 4037605

[51] Int. Cl.$^5$ ............................................. C08S 11/193
[52] U.S. Cl. ........................................ 536/90; 536/91; 536/92
[58] Field of Search .................... 536/90, 91, 92

[56] References Cited

U.S. PATENT DOCUMENTS

| | | | |
|---|---|---|---|
| 3,357,971 | 12/1967 | Klug | 536/33 |
| 4,358,587 | 11/1982 | Brandt et al. | 536/91 |
| 4,501,887 | 2/1985 | Kornrumpf et al. | 536/95 |
| 4,550,161 | 10/1985 | Felcht et al. | 536/91 |
| 4,650,863 | 3/1987 | Felcht et al. | 536/91 |
| 4,845,207 | 7/1989 | t'Sas | 536/91 |
| 4,902,733 | 2/1990 | Angerer | 536/88 |
| 4,904,772 | 2/1990 | Sau | 536/91 |

FOREIGN PATENT DOCUMENTS 0319867 12/1988 European Pat. Off.

OTHER PUBLICATIONS

Natalia Hurduc, "Cellulose Chemistry and Technology," Jan.-Feb., 1970, pp. 390-393.

*Primary Examiner*—Nathan M. Nutter
*Attorney, Agent, or Firm*—Sprung Horn Kramer & Woods

[57] ABSTRACT

Water-soluble hydroxypropyl sulfoethyl cellulose derivatives having an average degree of substitution (DS) with sulfoethyl groups of <0.3 and a molar degree of substitution (MS) with hydroxypropyl or <2.

4 Claims, No Drawings

WATER-SOLUBLE HYDROXYPROPYL SULFOETHYL CELLULOSE DERIVATIVES (HPSEC) HAVING A LOW DEGREE OF SUBSTITUTION AND A PROCESS FOR THEIR PRODUCTION

This invention relates to ionic water-soluble hydroxypropyl sulfoethyl cellulose derivatives and to a process for their production.

Water-soluble cellulose ethers have a broad spectrum of applications, cf. the Chapter entitled "Celllluloseether (Cellulose Ethers)" in Ullmanns Enzyklopadie der technischen Chemie, Vol. 9, pages 192–212 (Verlag Chemie, Weinheim, 1975).

In addition to a high yield of reagent and good solution quality, the minimal use of etherifying agents is desirable for an economic and efficient process for the production of cellulose ethers.

DE-OS 37 42 104 describes a process for the production of a sulfoethyl cellulose (SEC) having excellent solution qualities and its reaction with reagents typically used in cellulose chemistry, such as for example chloroacetic acid, ethylene oxide, propylene oxide, methyl or ethyl chloride. The solutions are said to have viscosities of 15 to 60,000 mPa.s (as measured in 2% by weight aqueous solution at a shear rate D of 2.5 sec.$^{-1}$ at 20° C.). The yield in regard to the sulfoalkylating agent VSSNa (sodium salt of vinyl sulfonic acid) is only 48 to 56%. Nothing is said about the yield of propylene oxide (PO). The average degree of substitution (DS) in regard to sulfoethyl is said to be between 0.4 and 1.4, i.e. is in a range in which solubility in water is already very good.

US-PS 3,357,971 describes a process for the production of mixed, ionic thermoplastic cellulose mixed ethers which are soluble in cold water. The hydroxypropyl group acts as a nonionic substituent. Carboxy, dialkylamino and sulfoalkylating groups or sulfating groups act as second substituents. The molecular degree of substitution (MS) in regard to hydroxypropyl is said to be >2 and, more particularly, 4. The average degree of substitution (DS) of the ionic substituent is between 0.001 and 0.4. The syntheses mentioned in the Examples for the preparation of a water-soluble hydroxypropyl sulfoethyl cellulose (HPSEC) give yields in regard to vinyl sulfonic acid sodium salt (or sodium 2-chloroethanesulfonate) of 18.7% (or 11.4%). The yield in regard to the highly carcinogenic propane sultone in the preparation of a hydroxypropyl sulfopropyl cellulose (HPSPC) is given as 21.7%. Nothing is said about the yield of propylene oxide (PO).

In view of the reaction conditions (reaction time 16 hours; working up in acidic medium), the viscosity of the solutions of the hydroxypropyl sulfoalkyl cellulose derivatives mentioned in the Examples is only 570 or 2,000 mPa.s (as measured in 2% by weight aqueous solution at a shear rate of D 2.5 sec$^{-1}$ at 20.C).

Ionic hydroxyalkyl cellulose ethers containing carboxyalkyl, sulfonoalkyl, phosphonoalkyl and N,N-dialkylaminoalkyl groups are among the, water-soluble cellulose mixed ethers described in EP 0 161 607, EP 0 126 959, EP 0 080 678 and DE-A 33 06 621. The products, which are not characterized in regard to their viscosity, their degree of substitution or their yield, are prepared either in dimethyl ether or dimethoxyethane alone or in admixture with alkanols, alkanediols and/or alkoxyalkanols.

FR-PS 23 06 215 describes a process for the production of water-soluble, ionic hydroxypropyl cellulose mixed ethers having thermal flocculation points, i.e. degrees of substitution with hydroxypropyl, of approximately 4. Monochloroacetic acid (or sodium monochloroacetate) or the highly carcinogenic propane sultone is used as alkylating agent in this process.

The problem addressed by the present invention was to provide water-soluble hydroxypropyl sulfoethyl cellulose derivatives (HPSEC) in high yields and with minimal use of etherifying agent in all viscosity ranges and an efficient and economic process for their production.

It is known that an average degree of substitution (DS) with sulfoalkyl of approximately 0.3 is required for the production of a water-soluble sulfoalkyl cellulose (see inter alia K. Engelskirchen, in Houben-Weyl's "Makromolekulare Stoffe", Vol. E 20/III, page 2083, edited by A. Barth and J. Falbe, Georg Thieme Verlag, Stuttgart/New York, 1987 and N. N. Shorygina, Z. I. Kuznetsova, V. S. Arkhipova, V. M. Prostyakova, Vysokomol. Soedin Ser. B 10, 438 (1968); C. A. 69, 53003 (1968)). A molecular degree of substitution (MS) with hydroxypropyl of approximately 4 is required for the production of water-soluble hydroxypropyl cellulose (see A. P. Savage, N. M. Bikales and L. Segal in "High Polymers", Vol. V, Cellulose and Cellulose Derivatives, Part V, page 806, Wiley lnterscience, New York/London/Sydney/Toronto, 1971).

It has now surprisingly been found that hydroxypropyl sulfoethyl cellulose mixed ethers are readily soluble in water at degrees of substitution at which the pure cellulose ethers (SEC or HPC) are still not soluble in water.

The present invention relates to water-soluble hydroxypropyl sulfoethyl cellulose (HPSEC) derivatives having an average degree of substitution (DS) with sulfoethyl of 0.3 and, more particularly, <0.2, a molar degree of substitution (MS) with hydroxypropyl of 2 and, more particularly, <1.95 and a viscosity of 5 to 80,000 mPa.s and, more particularly, 3,000 to 50,000 mPa.s (as measured in a 2% by weight aqueous solution at a shear rate D of 2.5 sec.$^{-1}$ at 20° C. The hydroxypropyl sulfoethyl celluloses according to the invention are distinguished by high solubility in water, i.e. the products have a small insoluble component of 5% or less, as determined by centrifugation (20 minutes at 2,500 G).

The synthesis of water-soluble cellulose ethers containing the same or different types of substituents is known from the literature. Cellulose mixed ethers can be obtained by carrying out the reaction in one or more stages. Depending on the etherifying agent used, the single-stage or multistage reactions may take place with complete consumption of alkali or in the presence of catalytic quantities of a base.

The process according to the invention for the production of water-soluble hydroxypropyl sulfoethyl cellulose derivatives (HPSEC) is preferably carried out in a cylindrical reaction vessel equipped with a suitable stirrer which provides for adequate mixing of the heterogeneous reaction mixture. The reaction vessel is preferably closed to enable the reaction to be carried out in a nitrogen atmosphere. Adequate means for heating the reaction vessel should also be present.

The process may be divided into the following reaction steps:

(a) formation of an alkali cellulose by reaction of cellulose with alkali or alkali/ammonia mixtures, (b) etherification of the alkali cellulose in the presence of a base with at least one etherifying agent (sulfoalkylating agent and/or a compound capable of transferring hydroxypropyl groups) which requires an at least catalytic quantity of a base, (c) optionally further etherification with at least one etherifying agent (a) compound capable of transferring hydroxypropyl groups, a sulfoalkylating agent or the like).

Propylene oxide (PO) is preferably used as the compound capable of transferring hydroxypropyl groups. Haloethane or vinyl sulfonic acid, more particularly vinyl sulfonic acid sodium salt, is used as the sulfonoalkyl etherifying agent. In addition, the HPSEC may be reacted with other etherifying agents, such as for example epoxides (for example butylene oxide, styrene oxide, glycidol), alkyl or aralkyl halides (for example methyl or benzyl chloride) and/or reagents capable of transferring 3-alkoxy-2-hydroxypropyl groups (for example isopropyl glycidyl ether).

Ground celluloses, more particularly linters, softwood sulfite, softwood sulfate or hardwood chemical pulps, are used as starting material for the process according to the invention.

The viscosity stages of the products may be established by exclusion or addition of oxidizing substances, such as for example air, $H_2O_2$ and metal oxides, and through the choice of the celluloses used which have different average degrees of polymerization.

The cellulose is generally alkalized with an alkali metal hydroxide, more particularly NaOH, which is used in solid or dissolved form (as an aqueous alkali metal hydroxide solution, for example having a concentration of 15 to 50% by weight); the quantity of alkali introduced should not exceed a quantity of 1.8 mol sodium hydroxide per mol cellulose.

Alkalization of the cellulose may be carried out either without or, where an extremely low fiber content is required, with ammonia (temperature $-33°$ to $-60°$ C.) in the presence of organic solvents. Activation with ammonia at low temperatures is known from the literature and, accordingly, need not be described in detail here (see for example EP 0 108 991).

To obtain uniformly etherified products and to avoid local overheating, alkalization of the cellulose and subsequent alkylation with at least one etherifying agent are preferably carried out in the presence of organic solvents as suspending agents, such as aromatic and/or aliphatic hydrocarbons, ketones, sulfoxides, cyclic ethers or lower alcohols preferably containing 2 to 5 carbon atoms per molecule and also mixtures of these solvents. Isopropanol and 2-methylpropan-2-ol (tertiary butanol) or mixtures thereof (0.5 to 20 times the quantity by weight of the cellulose) are particularly suitable for use in the process according to the invention.

For etherification, sodium hydroxide having a concentration of 15 to 100% by weight is added to the cellulose. The addition of at least one of the etherifying agents is made either before addition of the sodium hydroxide or after the alkalization phase. The ratio of alkali to cellulose in the first stage of the reaction is 0.2 to 1.8:1 (more particularly 0.5 to 1.5:1).

The ratio of water to cellulose is 2 to 20:1 (more particularly 4 to 18:1). In the process according to the invention, the alkali content is reduced to 0.3 to 1.5 mol and more particularly to 0.5 to 0.8 mol sodium hydroxide per mol cellulose before the reaction with at least one of the two etherifying agents, but in any event after the first etherification stage, by washing out with a suitable known solvent (for example water or alcohol/water mixtures) or by neutralization with an inorganic or organic acid, followed by reaction with a second etherifying agent in the presence or absence of an inert diluent.

The etherifying agents propylene oxide and vinyl sulfonic acid sodium salt may be introduced together and react with the alkali cellulose first at 10° to 60° C. and then at 40° to 120° C. over a reaction time of 0.5 to 6 hours. Equally, vinyl sulfonic acid sodium salt may first be reacted with the alkali cellulose in the presence or absence of an organic solvent, formation of the mixed ether taking place with or without purification or neutralization of the SEC prepared in the first stage. More particularly, the alkali content is reduced after the first etherification stage and any sodium hydroxide still present is advantageously used for the second etherification stage. The subsequent reaction with PO is carried out in the presence or absence of organic solvents at temperatures of, initially, 10° to 60° C. and, subsequently, 40° to 120° C. over a reaction time of 0.5 to 6 hours. Conversely, the etherification may also be carried out by conducting the reaction with PO in the first etherification stage and subsequently reacting the vinyl sulfonic acid sodium salt at 55° to 100° C. in the absence or, preferably, in the presence of an inert organic solvent, more particularly isopropanol. In addition, vinyl sulfonic acid sodium salt and 10 to 80% of a certain quantity of propylene oxide may be reacted in the presence of cellulose, alkali and water and in the presence or absence of an organic solvent. After most of the alkali has optionally been completely or partly neutralized or washed out, etherification may be carried out with 90 to 20% of the quantity of PO at, preferably, a relatively low alkali content.

However, the synthesis of an HPSEC by the process according to the invention may also be carried out with additional etherifying agents. Thus, a reaction with epoxides, alkyl or aralkyl halides and/or reagents capable of transferring alkoxy-2-hydroxypropyl groups may be carried out in one or more stages. The order in which the reagents are added is not crucial to the production of the cellulose ether.

The product thus obtained is optionally separated from the slurry medium (centrifugation or filtration) and freed from adhering salts by washing with alcohols, alcohol/water mixtures, ketones or ketone/water mixtures. Where etherification is carried out in two stages, purification may be carried out after the first stage using organic solvents, but especially water. By virtue of the catalytic quantity of alkali present in the second stage, it is also possible either to wash out the excess alkali with suitable aqueous alcoholic solvent mixtures, thus eliminating the need for neutralization, or—in the event of neutralization—to leave the small quantities of salts in the product and hence to dispense with purification.

The cellulose ethers obtainable by the process according to the invention may be used for known applications, for example as an additive for building materials. More particularly, the HPSEC is used for applications where the presence of a certain fiber component is of considerable use (for example as a tile adhesive). The HPSEC is also suitable as a dispersant and suspending agent and as an auxiliary and viscosity promoter in aqueous systems, for example as a stabilizer, dispersion and suspending agent in emulsion and suspension polymerizations. It may also be used as a thickener and stabilizer in surfactant-containing systems, including for example detergents and cosmetics, and also for emulsion paints.

The process according to the invention affords the following advantages:

1. By activation in liquid ammonia optionally preceding the etherification phase or by the preferred use of etherifying agents which react with catalytic quantities of alkali, the etherification reaction requires only a small content of alkali. This in turn means a correspondingly small quantity of neutralizing agent which may be necessary for working up or a correspondingly small quantity of aqueous organic solvents for optionally washing out the alkali.

The quantity of alkali optionally washed out with water or aqueous-organic solvents may readily be recovered and may be reused for another reaction.

2. The small alkali and water content considerably reduces the formation of secondary products from the etherifying agents, so that far less etherifying agent is necessary for the reaction. The process according to the invention leads to water-soluble hydroxypropyl sulfoethyl celluloses having low degrees of substitution and a small water-insoluble component of 5% or less. High-quality products are obtained for a minimal outlay on chemicals.

3. By virtue of the low salt content optionally present in the end product through the process according to the invention, the water-soluble products may be used without additional purification for certain fields of application.

4. If a salt-free product is required, the products obtained by the process according to the invention may be inexpensively purified.

5. Activation (pre-swelling) of the cellulose in liquid ammonia, optionally before etherification, provides for more uniform substitution along the cellulose chain which is reflected inter alia in improved solution quality and in greater stability to enzymatic degradation reactions, so that the low-substitution mixed ethers thus obtained may also be used for applications requiring the complete absence of fibers and extremely high solution quality (for example cosmetics, polymerization, emulsion paints).

The abbreviations DG (degree of substitution) and MS (molar degree of substitution) used in connection with the cellulose ethers according to the invention have the usual meanings:

Each anhydroglucose unit of the cellulose has three hydroxyl groups.

DS: Average number of the hydroxy groups substituted in the cellulose per anhydroglucose unit.

MS Average number of mols of the reactants combined with cellulose per anhydroglycose unit.

In the following Examples, parts are parts by weight. The viscosities were measured with a Haake type RV 100 rotational viscosimeter (system M 500, measuring unit MV) in accordance with DIN 53 019 at a shear rate D of 2.5 sec.$^{-1}$ and at a temperature of 20° C. 2% by weight solutions in distilled water were measured in every case.

EXAMPLE 1

87.1 Parts of a finely ground spruce sulfite chemical pulp are suspended in 1,065.8 parts tertiary butanol in a pressure reactor comprising a wall-sweeping blade stirrer and the reactor is purged with nitrogen. 13.14 parts of a 49.5% by weight aqueous vinyl sulfonic acid sodium salt solution are added. The mixture is stirred for 15 minutes. 101.5 Parts water and 59.9 parts of a 50.1% by weight sodium hydroxide solution are then added. After addition of 174.2 parts propylene oxide (PO), the mixture is alkalized for 80 minutes at 25° C. It is then heated to 90° C. over a period of 60 minutes and kept at that temperature for 120 minutes. The mixture is then neutralized with an equimolar quantity of concentrated acetic acid. The product is filtered off and washed three times with 2,000 parts of a mixture of 8 parts acetone and 2 parts water and, finally, with 2,000 parts pure acetone. The product is dried in air. The production data of the product are shown in Table 1, the product data are set out in Table 2.

EXAMPLES 2 TO 5

Production is carried out in the same way as described in Example I. The production data are shown in Table 1 while the product data are set out in Table 2.

EXAMPLE 6a

Production of a sulfoethyl cellulose (SEC)

135.36 Parts chemical pulp (cotton linters) are suspended in 2,193 parts tertiary butanol in a cylindrical reaction vessel which is provided with a suitable stirring unit and which can be suitably thermostatically controlled and filled with a nitrogen atmosphere. 19.83 Parts of a 51.6% by weight solution of sodium vinyl sulfonate are then added, followed by thorough mixing for 15 minutes. 193.2 Parts water and 47.16 parts sodium hydroxide are then added and the mixture is alkalized for 80 minutes at 25° C. The mixture is then heated to 80° C. over a period of 1 hour and kept at that temperature for 120 minutes. The mixture is neutralized by addition of an equimolar quantity of concentrated acetic acid, the product is filtered off and washed five times with 2,000 parts of a mixture of 7 parts methanol and 3 parts water and then dried in air. The sulfoethyl cellulose obtained is insoluble in water and is introduced into a pressure reactor for the subsequent reaction.

EXAMPLE 6b

Production of a hydroxypropyl sulfoethyl cellulose (HPSEC) from a sulfoethyl cellulose (SEC)

88.5 Parts of the SEC produced in Example 6a are introduced into a pressure reactor equipped with a wall-sweeping blade stirrer. The reactor is purged with nitrogen.

52.92 parts water and 15.68 parts sodium hydroxide prills are introduced with stirring into the cellulose ether. The mixture is then stirred for 30 minutes at 25° C. 56.92 parts propylene oxide (PO) are then sprayed on with continued stirring. The mixture is then heated to 80° C. over a period of 150 minutes. This temperature is maintained for 10 minutes with continued stirring. After neutralization with an equimolar quantity of concentrated acetic acid, the product is filtered off and washed four times with 2,000 parts of a mixture of 8 parts acetone and 2 parts water and, finally, with 2,000 parts pure acetone. The product is dried in air. The production data are shown in Table 1 while the product data are set out in Table 2.

EXAMPLE 7a

Production of a sulfoethyl cellulose (SEC)

138 Parts chemical pulp (cotton linters) are suspended in 2,177 parts tertiary butanol in a cylindrical reaction vessel which is provided with a suitable stirrer and which can be suitably thermostatically controlled. 103.3 Parts of a 30.23% by weight solution of sodium vinyl sulfonate are added to the suspension, followed by thorough mixing for 15 minutes. 150 Parts water and 48 parts sodium hydroxide are then added, followed by alkalization for 80 minutes at 25° C. The mixture is then heated to 70° C. over a period of 30 minutes and kept at that temperature for 150 minutes. The mixture is then neutralized by addition of an equimolar quantity of concentrated acetic acid, the product is filtered off and washed twice with 2,000 parts water and dried in air. The water-insoluble sulfoethyl cellulose obtained is introduced into a pressure reactor for the subsequent reaction.

EXAMPLE 7b

Production of a hydroxypropyl sulfoethyl cellulose (HPSEC) from a sulfoethyl cellulose (SEC)

The sulfoethyl cellulose produced in accordance with Example 7a is introduced into approximately 2,000 parts of a mixture of 8 parts acetone and 2 parts water. After 12 hours, the cellulose ether is filtered off and washed with approximately 2,000 parts pure isopropanol. 229.89 Parts of the isopropanol-containing SEC are introduced into a pressure reactor for the subsequent reaction. 56 Parts of a 22.8% by weight sodium hydroxide solution are sprayed on with stirring. The mixture is alkalized for 30 minutes at 25° C. 53.44 Parts propylene oxide are sprayed on with continued stirring. The mixture is then heated to 80° C. over a period of 60 minutes and etherified for 240 minutes at that temperature. After neutralization with an equimolar quantity of concentrated acetic acid, the product is filtered off, washed four times with 2,000 parts of a mixture of 8 parts acetone and 2 parts water and then with 2,000 parts pure acetone. The product is dried in air. The production data and product data are set out in Tables 1 and 2, respectively.

EXAMPLE 8

Production of a hydroxypropyl sulfoethyl cellulose (HPSEC)

81.1 Parts of a finely ground, bleached and refined spruce sulfite chemical pulp are suspended in 1,065.8 parts tertiary butanol in a pressure reactor comprising a wall-sweeping stirrer and the reactor is purged with nitrogen. 52.57 Parts of a 49.5% by weight aqueous, vinyl sulfonic acid sodium salt solution are added and the mixture is stirred for 15 minutes. 83.71 Parts water and 59.88 parts of a 50.1% by weight sodium hydroxide solution are then sprayed on, followed by alkalization for 60 minutes at 25° C. 58.1 Parts propylene oxide are sprayed on. The mixture is then heated to 80° C. over a period of 90 minutes and kept at that temperature for 240 minutes. The mixture is then hot-neutralized with an equimolar quantity of concentrated acetic acid, the product is filtered off and washed three times with 2,000 parts of a mixture of 8.5 parts methanol and 1.5 parts water and, finally, with 2,000 parts pure methanol. The product is dried in air. The production data are set out in Table 1 while the product data are shown in Table 2.

TABLE 1

PRODUCTION CONDITIONS

Examples 1–8

Legend to Table 1 and 2 iso-PrOH: propan-2-ol
tert. BuOH: 2-methylpropan-2-ol
Spruce: chemical pulp of ground, bleached spruce pulp, particle size <0.4 mm
Linters: chemical pulp of ground bleached cotton linters, particle size <0.4 mm
VSSNa: vinyl sulfonic acid sodium salt
NaOH: sodium hydroxide
H$_2$O: water
PO: propylene oxide
N$_2$: the entire reaction was carried out in a nitrogen atmosphere.

TABLE 2

PRODUCT DATA

Examples 1 to 8

Legend to Table 2

DS: average degree of substitution, number of substituents per anhydroglucose units
MS: molar degree of substitution, number of substituent units per anhydroglucose unit
Yield: quantity of alkylating agent reacted to the product, expressed in % of the vinyl sulfonic acid sodium or propylene oxide used

EVALUATION OF THE SOLUTION

Flow behavior:
very good—smooth-flowing
good—less smooth-flowing
satisfactory—not smooth-flowing
poor—partly gelled to gelatinous
inadequate—phase separation
Appearance of the solution:
very good—clear
good—slightly cloudy
satisfactory—cloudy
poor—sediment

TABLE 1

| | | | | | | Production conditions | | | |
| Example | iso-PrOH [parts] | tert. BuOH [parts] | Pulp [parts] | Pulp type | VSSna sol. [parts] | Conc. of VSSna sol. [% by weight] | NaOH sol [parts] | Conc. of NaOH sol. [% by weight] |
|---|---|---|---|---|---|---|---|---|
| 1 | — | 1065.8 | 87.1 | Spruce | 13.14 | 49.5 | 59.9 | 50.1 |
| 2 | 1065.8 | — | 87.1 | Spruce | 19.72 | 49.5 | 59.9 | 50.1 |
| 3 | 1065.8 | — | 84.9 | Spruce | 13.14 | 49.5 | 59.9 | 50.1 |
| 4 | 1065.8 | — | 87.1 | Spruce | 26.28 | 49.5 | 59.9 | 50.1 |
| 5 | — | 1065.8 | 87.1 | Spruce | 19.71 | 49.5 | 43.9 | 50.1 |
| 6a | — | 2193 | 135.36 | Linters | 19.83 | 51.6 | 47.16 | 100 |
| 6b | — | — | 88.5* | Linters | — | — | 15.68 | 100 |
| 7a | — | 2177 | 138 | Linters | 103.3 | 30.23 | 48.0 | 100 |
| 7b | — | — | 229.89** | Linters | — | — | 56.0 | 22.8 |
| 8 | — | 1065.8 | 87.1 | Spruce | 52.57 | 49.5 | 59.9 | 50.1 |

TABLE 1-continued

| | Production conditions | | | | | |
|---|---|---|---|---|---|---|
| Example | PO [parts] | H$_2$O [parts] | Heating time [mins.] | Reaction time [mins.] | Reaction temp. [°C.] | Atmosphere |
| 1 | 101.5 | 174.2 | 60 | 120 | 90 | N$_2$ |
| 2 | 98.1 | 203.3 | 60 | 120 | 90 | N$_2$ |
| 3 | 103.6 | 232.3 | 60 | 180 | 70 | N$_2$ |
| 4 | 94.8 | 174.2 | 60 | 180 | 70 | N$_2$ |
| 5 | 106.1 | 203.3 | 60 | 120 | 80 | N$_2$ |
| 6a | 193.2 | — | 60 | 120 | 80 | N$_2$ |
| 6b | 52.92 | 56.92 | 150 | 10 | 80 | N$_2$ |
| 7a | 150 | — | 30 | 150 | 70 | Air |
| 7b | — | 53.44 | 60 | 240 | 80 | Air |
| 8 | 83.71 | 58.1 | 90 | 240 | 80 | N$_2$ |

*SEC
**isopropanol-containing SEC

TABLE 2

| | Product data | | | | | | | |
|---|---|---|---|---|---|---|---|---|
| | Viscosity, 2% in dist. water [mPa · s] | DS sulfoethyl | Yield (VSSNa) [%] | MS hydroxy propyl | Yield (PO) [%] | Evaluation of the solution | | |
| Example | | | | | | Flow behavior | Appearance | Fiber content [%] |
| 1 | 5,733 | 0.05 | 50 | 1.65 | 27.5 | Very good | Very good | <1 (Water-soluble) |
| 2 | 10,487 | 0.11 | 73.3 | 1.33 | 19.0 | Very good | Very good | <1 (Water-soluble) |
| 3 | 16,412 | 0.05 | 50 | 1.29 | 16.1 | Good | Very good | <2 (Water-soluble) |
| 4 | 27,950 | 0.13 | 65 | 0.78 | 13.0 | Good | Very good | <2 (Water-soluble |
| 5 | 10,033 | 0.10 | 67 | 1.92 | 27.4 | Good | Very good | <3 (Water-soluble) |
| 6a | — | 0.07 | 70 | — | — | Inadequate | Poor | >95 (Water-soluble) |
| 6b | 16,101 | 0.07 | 70 | 1.22 | 61.0 | Very good | Good | <5 (Water-soluble) |
| 7a | — | 0.19 | 76 | — | — | Inadequate | Poor | >95 (Water-soluble) |
| 7b | 764 | 0.19 | 76 | 1.28 | 55.6 | Very good | Good | <3 (Water-soluble) |
| 8 | 22,551 | 0.27 | 67.5 | 0.59 | 29.5 | Good | Very good | <3 (Water-soluble) |

We claim:

1. Water-soluble hydroxypropyl sulfoethyl cellulose derivatives having a molar degree of substitution MS with hydroxypropyl groups of less than 2 and an average degree of substitution DS with sulfoethyl groups and optionally other substituents of less than 0.3 and a viscosity of 5 to 80,000 (mPa.s), as measured on a 2%, by weight aqueous solution at a shear rate D of 2.5 sec.$^{-1}$ and at a temperature of 20° C., said optional other substituents being selected from the group consisting of hydroxybutyl, hydroxy styryl, alkyl, aralkyl and 2-alkoxy-2-hydroxypropyl.

2. A process for the production of the water-soluble hydroxyporpyl sulfoethyl cellulose derivatives claimed in claim 1, characterized in that it comprises the following steps:
   (a) alkalization of the cellulose by reaction of cellulose with alkali,
   (b) etherification of the alkali cellulose with at least one of a sulfoalkylating agent and a compound transferring hydroxypropyl groups in the presence of a base,
   (c) optionally further etherification with at least one etherifying agent which requires an at least catalytic quantity of base for reaction with the cellulose and
   (d) optionally neutralization, optionally filtration and optionally washing out of the salts remaining in the product or the quantity of base present in the reactor.

3. A process as claimed in claim 2, characterized in that propylene oxide and vinyl sulfonic acid or Na vinyl sulfonate is used in step (6).

4. A process as claimed in claim 2, characterized in that the additional etherification step if carried out with at least one of epoxides, alkyl or aralkyl halides and reagents capable of transferring 3-alkoxy-2-hydroxypropyl groups.

* * * * *

UNITED STATES PATENT AND TRADEMARK OFFICE
CERTIFICATE OF CORRECTION

PATENT NO. : 5,177,199
DATED : January 5, 1993
INVENTOR(S) : Kiesewetter et al.

It is certified that error appears in the above-identified patent and that said Letters Patent is hereby corrected as shown below:

Col. 9, line 39  After " 2% " delete " , "

Col. 9, line 44  After " and " delete " 2-alkoxy " and substitute -- 3-alkoxy --

Col. 10, line 46  After " step " delete " (6) " and substitute -- (b) --

Signed and Sealed this

First Day of March, 1994

BRUCE LEHMAN

*Attesting Officer*   Commissioner of Patents and Trademarks